(12) United States Patent
Oleszczuk

(10) Patent No.: US 8,355,403 B2
(45) Date of Patent: Jan. 15, 2013

(54) STALE DATA REMOVAL USING LATENCY COUNT IN A WIMAX SCHEDULER

(75) Inventor: Antoni Oleszczuk, Calgary (CA)

(73) Assignee: Fujitsu Semiconductor Limited, Yokohama (JP)

( * ) Notice: Subject to any disclaimer, the term of this patent is extended or adjusted under 35 U.S.C. 154(b) by 1178 days.

(21) Appl. No.: 11/754,521

(22) Filed: May 29, 2007

(65) Prior Publication Data
US 2008/0112344 A1 May 15, 2008

Related U.S. Application Data

(60) Provisional application No. 60/865,463, filed on Nov. 13, 2006.

(51) Int. Cl.
 H04L 12/56 (2006.01)
 H04L 12/54 (2006.01)
(52) U.S. Cl. ..................... 370/395.4; 370/412
(58) Field of Classification Search .......... 370/151, 370/241, 230–234, 229, 395.4–395.43, 395.1–395.21, 370/310, 412–416; 455/450–452.2; 713/503; 718/102–105
See application file for complete search history.

(56) References Cited

U.S. PATENT DOCUMENTS

| | | | |
|---|---|---|---|
| 6,480,491 B1 * | 11/2002 | Miao | 370/394 |
| 6,738,386 B1 * | 5/2004 | Holmqvist | 370/412 |
| 6,909,722 B1 * | 6/2005 | Li | 370/412 |
| 7,054,267 B2 * | 5/2006 | Ramanan et al. | 370/229 |
| 7,359,349 B2 * | 4/2008 | Kayama et al. | 370/329 |
| 2002/0037729 A1 * | 3/2002 | Kitazawa et al. | 455/452 |
| 2004/0082364 A1 * | 4/2004 | Kitazawa et al. | 455/560 |
| 2005/0094618 A1 * | 5/2005 | Colban et al. | 370/350 |
| 2005/0111361 A1 * | 5/2005 | Hosein | 370/230 |
| 2007/0153891 A1 * | 7/2007 | Van Der Stok et al. | 375/240.1 |
| 2007/0201365 A1 * | 8/2007 | Skoog et al. | 370/230.1 |
| 2008/0002584 A1 * | 1/2008 | Leng | 370/235 |

FOREIGN PATENT DOCUMENTS

JP 2004-147275 5/2004

OTHER PUBLICATIONS

Park et al, "Scheduler Design for Multiple Traffic Classes in OFDMA networks", IEEE, Jun. 2006.*
Japanese Office Action issued Oct. 25, 2011 in Japanese Patent Application No. 2007-284160.

* cited by examiner

*Primary Examiner* — Habte Mered
(74) *Attorney, Agent, or Firm* — Staas & Halsey LLP

(57) ABSTRACT

A system and method of removing items from a transmission scheduler queue includes assigning a latency count to each item indicating latency, i.e. time the item has remained in the system before being transmitted, adding a number of frames that have elapsed since a previous scheduler run to the latency count at each scheduler run to obtain a current latency count, comparing the current latency count to a removal period, which may be predetermined once or recalculated in each scheduler run, and removing the item if the comparison indicates that the current latency count exceeds the removal period before the item has been output from the queue.

13 Claims, 5 Drawing Sheets

STALE DATA REMOVAL USING LATENCY COUNT IN A WIMAX SCHEDULER

CROSS-REFERENCE TO RELATED APPLICATION(S)

The present application claims priority to provisional application titled "Stale Data Removal By Using Latency Count In AWimax Scheduler", Ser. No. 60/865,463, filed Nov. 13, 2006, inventor Antoni Oleszcsuk, and which is incorporated herein by reference.

BACKGROUND OF THE INVENTION

Wireless communication networks have become increasingly popular. One form of communication network, a so-called WiMAX system, may be defined by a standard such as the Institute for Electrical and Electronics Engineers (IEEE) 802.16. This document uses terminology, including abbreviations, that is also used by the IEEE 802.16 standard for the sake of convenience, but is not meant to be limited thereby.

FIG. 1 is an illustrative example of a communication network 100. The communication network 100 may include a base station (BS) 102 that provides service to a cell area located around the base station 102. One or more subscriber stations (SS) 108, which may be mobile stations (MS), cell phones, laptops, and the like, may be able to communicate with the base station 102 when they are within the service area 110 of the base station 102. The communication network may also include one or more relay stations (RS) 104 to extend the service area of the base station 102 if, for example, the broadcasting range of the base station 102 is insufficient to reach a subscriber station 106 or a mobile station.

User data packets may be transmitted over the transmission path 114 between the base station 102 and the subscriber station 108. User data packets may also be transmitted between the base station 102 and the relay station 104 over the transmission path 112, to be retransmitted to the subscriber station 106 over the transmission path 116. User data packets may include items having various priorities for their delivery. The base station 102 and the subscriber stations 106 and 108 may include schedulers to schedule the items for transmission according to their priorities.

SUMMARY OF THE INVENTION

Various embodiments of the present invention provide a scheduler of a station, such as a base station, a subscriber station, a relay station, etc., in a wireless network, the scheduler having a queue, or a number of queues, of items and a removal period, each of the items having a latency count that is updated on each run of the scheduler, an item being removed from the queue when a current latency count associated with the item exceeds the removal period.

Various embodiments of the present invention provide a method of removing items from a scheduler queue, including assigning a latency count to an item initially equal to zero, adding a number of frames that have elapsed since a previous scheduler run to the latency count at each scheduler run to obtain a current latency count, comparing the current latency count to a removal period, and removing the item if the comparison indicates that the current latency count exceeds the removal period before the item has been output from the queue.

Various embodiments of the present invention provide a system of removing items from a scheduler queue, having means for assigning a latency count to an item initially a non-zero number, such as a negative number having a magnitude equal to an allowed latency value of the item in the time units of frames, means for adding a number of frames that have elapsed since a previous scheduler run to the latency count at each scheduler run to obtain a current latency count, means for comparing the current latency count to a removal period, which may be adjusted by a value corresponding to that set initially to the latency count, and means for removing the item if the comparison indicates that the current latency count exceeds the removal period as before the item has been output from the queue.

Various embodiments of the present invention provide a scheduling system for a station, the system having a scheduler processing a plurality of items of user data and management messages in one or more input queues, each of the items having a latency count, the input queue having a predetermined size and a rate at which items are arrive at it, the rate being calculated or predetermined, wherein the latency count indicates a number of frames that have passed since the item was put in the input queue of the scheduler, and wherein an item is removed from the input queue when its latency count exceeds a ratio of the predetermined size and the input rate. Thus the ratio is a removal period. This may be calculated dynamically in each run of the scheduler or predetermined initially.

The above-described embodiments of the present invention are intended as examples, and all embodiments of the present invention are not limited to including the features described above.

DESCRIPTION OF THE PREFERRED EMBODIMENTS

Figure 1:
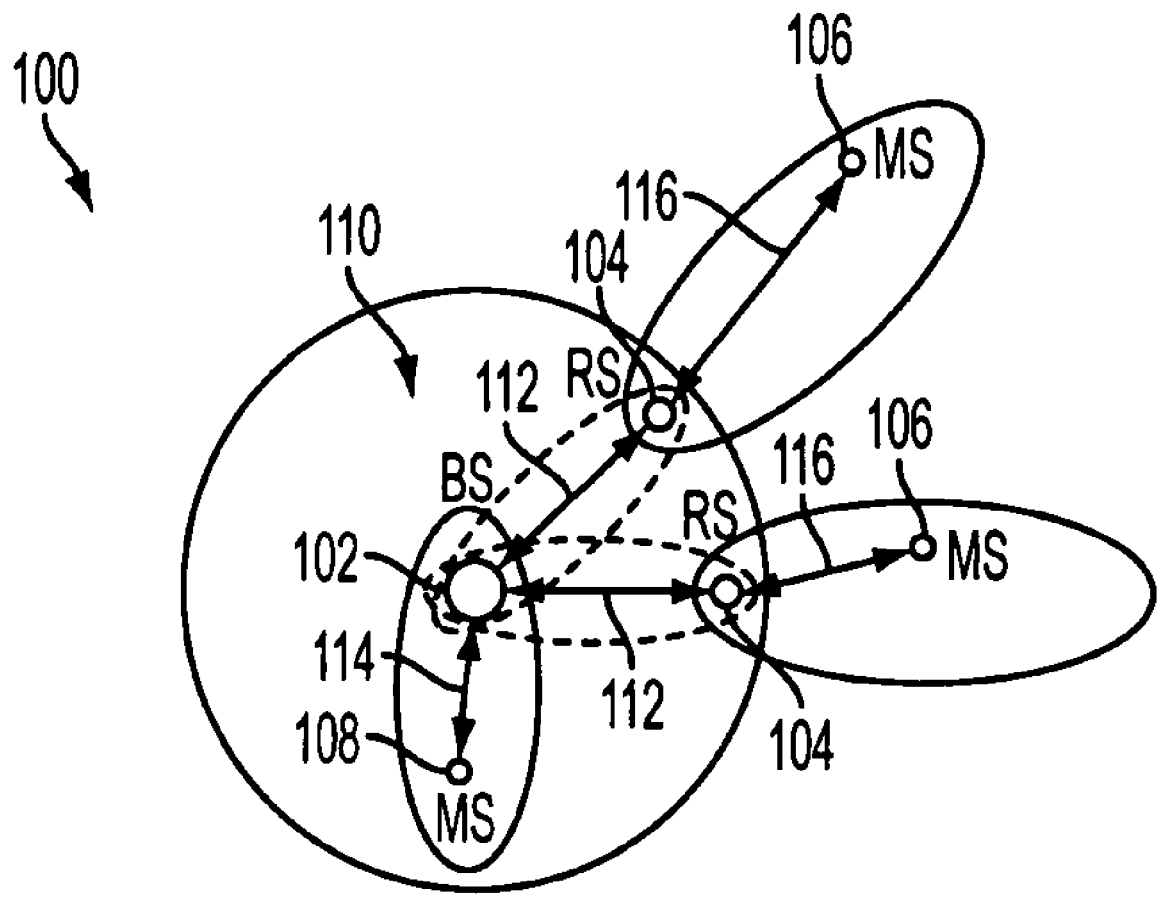
FIG. 1 is an illustrative example of a cell in a communication network according to the related art.

Reference may now be made in detail to embodiments of the present invention, examples of which are illustrated in the accompanying drawings, wherein like reference numerals refer to like elements throughout.

Various embodiments of the present invention will be described in terms of a base station or a subscriber station, but the invention is not meant to be limited thereby. Rather, the description may apply substantially equally to a mobile station, a base station, or a relay station, without departing from the spirit of the invention.

Figure 2:
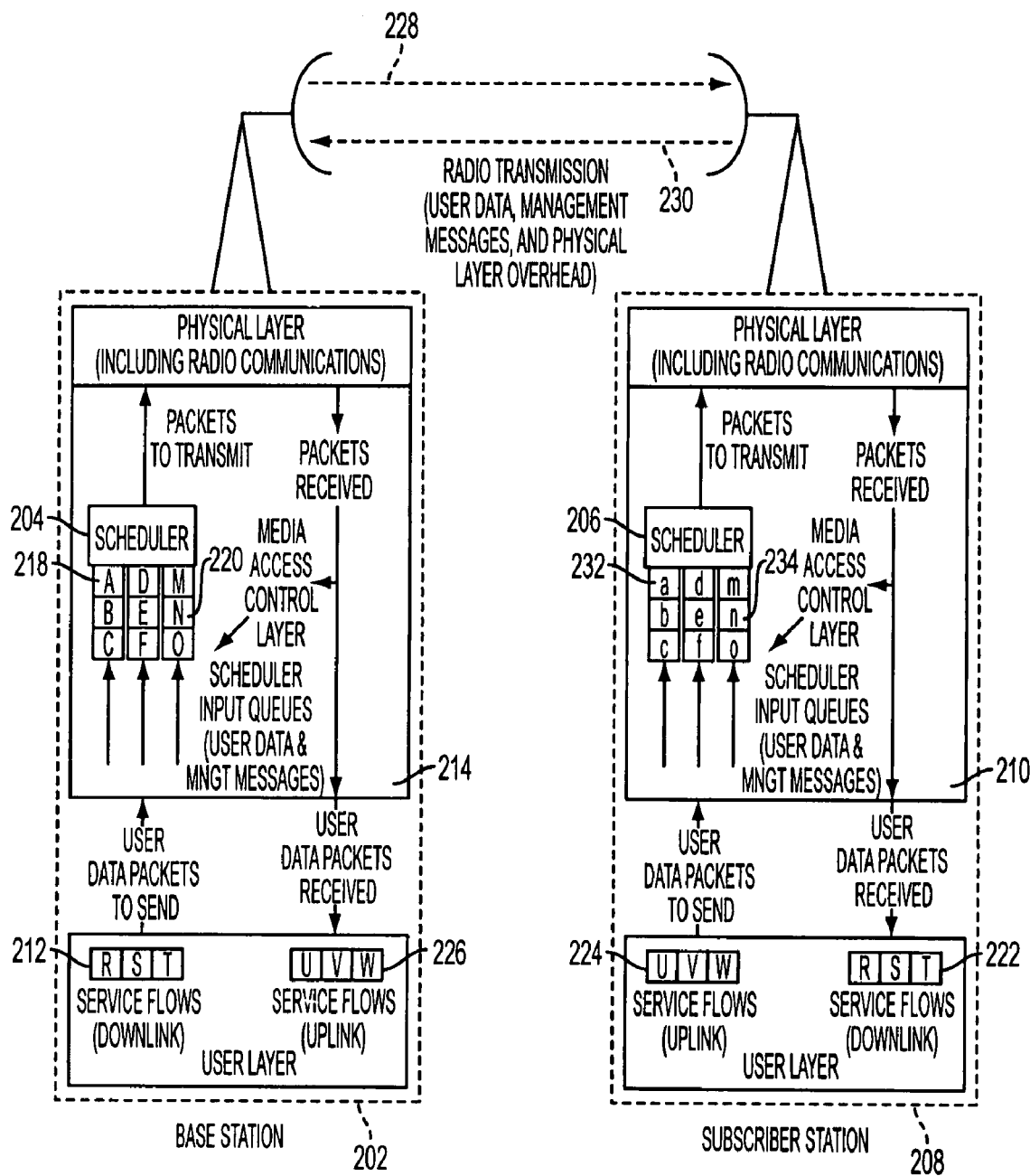
FIG. 2 is an illustrative example of the architecture of a base station and subscriber station in a communication network according to an embodiment of the present invention.

FIG. 2 is an illustrative example of the architecture of a base station and a subscriber station in communicating with each other according to an embodiment of the invention. The communication may include a base station 202, and a subscriber station 208 in communication with the base station 202, but the invention is not meant to be limited to a base station in communication with a subscriber station. The base station 202, for example, may send data packets belonging to service flows 212 to the subscriber station 208 with which it is communicating, where the received data packets belong to the corresponding service flows 222 of the subscriber station. The subscriber station 208 may in turn send its own data packets belonging to service flows 224 to the base station 202, where the received data packets belong to the corresponding service flows 226 of the base station.

The radio transmission 228 from the base station to the subscriber station may include frames carrying packets of user data 218 or management messages 220; similarly, the radio transmission 230 from the subscriber station to the base station may include frames carrying packets of user data 232 or management messages 234, but the invention is not limited to frames carrying packets of user data or management messages.

The base station 202 may include a media access control (MAC) layer 214 and a scheduler 204 to schedule both the data packets 218 belonging to the service flows 212 and the management messages 220 generated by the MAC layer for transmission, but the invention is not meant to be limited to a base station including a media access control and a scheduler. The media access control 214 layer may be concerned with sharing a physical connection to a network among several nodes. The subscriber station 208 may include a media access control (MAC) 210 layer and a scheduler 206 to schedule both the data packets 232 belonging to the service flows 224 and the management messages 234 generated by the MAC layer for transmission, but the invention is not limited to a subscriber station including a media access control and a scheduler.

The scheduler 204 of the base station 202 and the scheduler 206 of the subscriber station 208 may have input queues for processing the packets of user data 218 or 232 and the management messages 220 or 234, but the invention is not limited to a scheduler of a base station or a subscriber station having input queues for processing the packets of user data and the management messages. The user data 218 or 232 and the management messages 220 or 234 may arrive at the input queues of the scheduler, where they wait until the scheduler schedules them for re-sending to other stations. The user data 218 or 232 and management messages 220 or 234 may be put into different queues at the scheduler.

Figure 3:
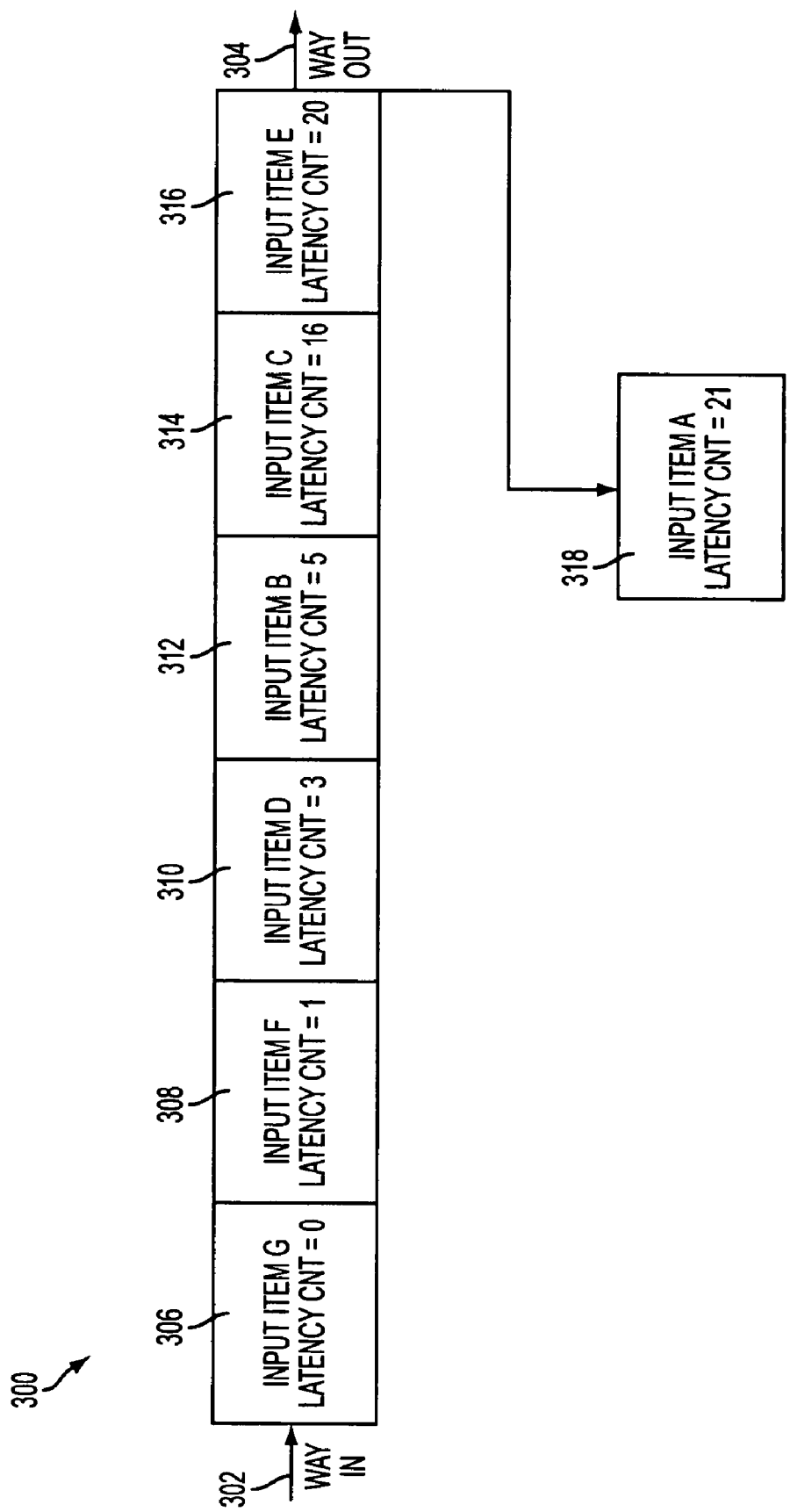
FIG. 3 is an illustrative example of an input queue for a base station or a subscriber station according to an embodiment of the present invention.

FIG. 3 is an illustrative example is of an input queue 300 for a base station or a subscriber station. Input items, such as user data packets or management messages, which arrive at the scheduler of a base station or a subscriber station, may be placed in the input queue 300 for transmission scheduling, but the invention is not meant to be limited to data packets or management messages being placed in an input queue for transmission scheduling. The items may enter the input queue 300 at the input end 302. The items in the input queue 300 may be ordered by their priority as may be required by the quality of service (QoS) parameters of the service flows to which they belong or by the management class (in the case of management messages). For example, FIG. 3 shows items ordered by their latency count; the higher the count the closer to the exit end 304, but the invention is not limited to input items being ordered by their latency count.

Some low priority input items, such as the input item 316, may stay in the input queue 300 for a relatively long time before they are sent. If the length of time the input item 316 spends in the input queue 300 before delivery exceeds a certain amount of time, the delayed delivery may cause the input item 316 to lose all sense. Thus, delivery of the input item 316 may no longer be necessary. Moreover, delaying delivery of the lower priority items, such as input item 316, may cause the input queue 300 to fill up with waiting items, preventing new items from entering the input queue 300. Therefore it may be better to remove those items whose delivery has been greatly delayed, such as the input item 316, from the input queue 300 than to keep them in the queues. This process is called stale data removal.

Various embodiments of the present invention provide a method in which a count of frames is kept for every item that arrives at the input queue 300, but the invention is not meant to be limited to a method of keeping a count of frames for every item that arrives in an input queue. Such a count may be called a latency count, and may be used to facilitate the removal of stale data, Each item of a service flow arriving at an input queue 300 of the scheduler may be assigned a latency count. The unit of the latency count may be, for example, one WiMAX frame. The unit of the latency count, however, is not limited to any particular type or quantity of units.

The latency count assigned to the item may be incremented periodically while the item remains in the input queue. In one embodiment, the latency count may be incremented by the number of frames that pass while the item remains in the input queue. If the latency count reaches a certain value before the item is delivered, the item may be removed. Thus, items that have remained in an input queue while too many frames have passed can be removed from the input queue.

Input items 306 and 308, for example, which have just recently arrived at input queue 300, may be seen to have been assigned latency counts of 0 and 1, respectively. Items 310, 312, 314, and 316, on the other hand, which have been waiting in input queue 300 longer, may be seen to have current latency counts of 3, 5, 16, and 20, respectively. In one embodiment, an item may be wrapped in a structure that defines its latency count. In this embodiment, the structure defining the latency count may be resident on the input queue 300, and does not follow an item after it is delivered.

The latency count of every item in the input queue 300 may be updated at the beginning of every run of the scheduler, but the invention is not meant to be limited to a latency count of an item in an input queue being updated at the beginning of every run of a schedulers The latency count may be updated by incrementing the latency count assigned to the item by the number of frames that have elapsed since the previous run of the scheduler.

If the scheduler is on a base station, the scheduler may run every frame. A scheduler on a subscriber station, on the other hand, may not send an item in each frame, since the subscriber station may have to wait for the base station to allocate bandwidth to it before it sends data; therefore, the scheduler on a subscriber station may run only when the station has received any bandwidth allocated by the base station to it.

Input items in the input queue 300 have different values of the latency count, ranging from a small number such as 0 to a relatively big numbers such as 20 and 21 in items 316 and 318 respectively. Any big value of the latency count indicates that the item has stayed for a long time in the input queue without being taken for transmission. Such an item, like 318, may no longer be relevant on the next station that is to receive the item. It is said that input item 318 have become "stale," and would no longer be relevant, even if it were delivered.

Various embodiments of the present invention provide a method of removing stale data, such as input item 318, from the input queue 300 to make room for newer data, but the invention is not meant to be limited to a method of removing stale data from an input queue to make room for newer data. The length of time an item may remain in an input queue 300 without being re-sent may be defined as a removal period, $T_{rem}$. If the latency count of an input item exceeds the removal period, the input item may be removed from the input queue 300. The removal period Trem may be configurable, i.e. predetermined, for a particular piece of hardware. In other embodiments, removal period Trem may be calculated. Different removal periods may be assigned to different service flows.

The input queue 300, for example, may have a removal period Trem of 20, but the invention is not meant to be limited to an input queue having a removal period of 20. The input item 318, which may have started with a lower priority than other items in the input queue 300, and waited while other items in the input queue 300 were delivered, may no longer have relevance, and can thus be discarded. Thus, input item 318, which may be seen to have a latency count of 21, exceeding the removal period Trem of 20, has been removed from the input queue 300.

The removal period Trem may be calculated for a service flow from the current traffic rate and the remaining size of the scheduler input queue 300 in which the data packets of the service flow are processed at the scheduler, but the invention is not meant to be limited to a removal period calculated from a current traffic rate and the remaining size of an input queue. If a data connection is assigned only a portion of the input queue 300, the removal period may be calculated from the current traffic rate and the size of the portion of the queue assigned to the data connection. In particular:

$$Trem = Qsize\ remaining/Current\ Traffic\ Rate \quad (1)$$

In one embodiment, the current traffic rate may be replaced by the maximum sustained traffic rate of the data connection (which is a QoS parameter). If the maximum sustained traffic rate is not defined for the service flow, the maximum rate possible for the data connection, or an estimate of the maximum rate, may be used instead.

If, for example, one frame were assumed to be 5 milliseconds (ms) for a queue which had a maximum sustained traffic rate of 10 megabits per second (Mbits/s), and there were 300 kilobytes (KB) remaining in the queue, then the removal period would be:

[(300,000 bytes)(8 bits/byte)/(10,000,000 bits/s)] (1000 ms/s)/(5 ms/frame)=48 frames Various embodiments of the present invention provide a method of calculating latency counts for items in an input queue. Quality of service (QoS) parameters of a service flow to which an item in an input queue belongs is used to derive a latency count for the item. In one embodiment, quality of service parameters that impose timing requirements such as jitter, and maximum latency are used to set the latency count to an initial value of an input item when it arrives at a scheduler queue. In this case the latency count is initially set to a negative number having a magnitude equal to an allowed latency in the time units of frames, meaning how many frames of delay an input item belonging to the service flow may incur without losing acceptability to the user. The latency count is then updated in the usual way, by adding a number indicating how many frames have elapsed between the updates. Using the initial negative value is convenient to check if the item is still within its allowed latency (by simply checking if the latency count is still negative), but this invention does not depend on using initial negative values on the latency count. Any initial value may be used, providing it is taken into account when the removal period is compared with the latency count of the input items.

For data connections that do not use latency or jitter, the latency count may be set initially to zero. The latency count may then be updated at the beginning of every run of the scheduler by adding the number of frames that have elapsed since the previous run to the latency count.

If an item entering a queue has already accrued some latency, the latency count may be adjusted by adding a positive number equal to the accrued latency to the latency count. This may be the case if, for example, there was some delay between the generation of a packet and its consignment to the scheduler for transmission.

For data connections that use latency or jitter, the removal period may be adjusted for the initial value of the latency count (since it is not zero). To the removal period may be added a number equal to the initial value of the latency count (which means the removal period value will decrease if the initial value is negative). However, this adjustment is not critical in view of the allowed latency being rather much smaller that the value of the removal period calculated from formula (1).

Figure 4:
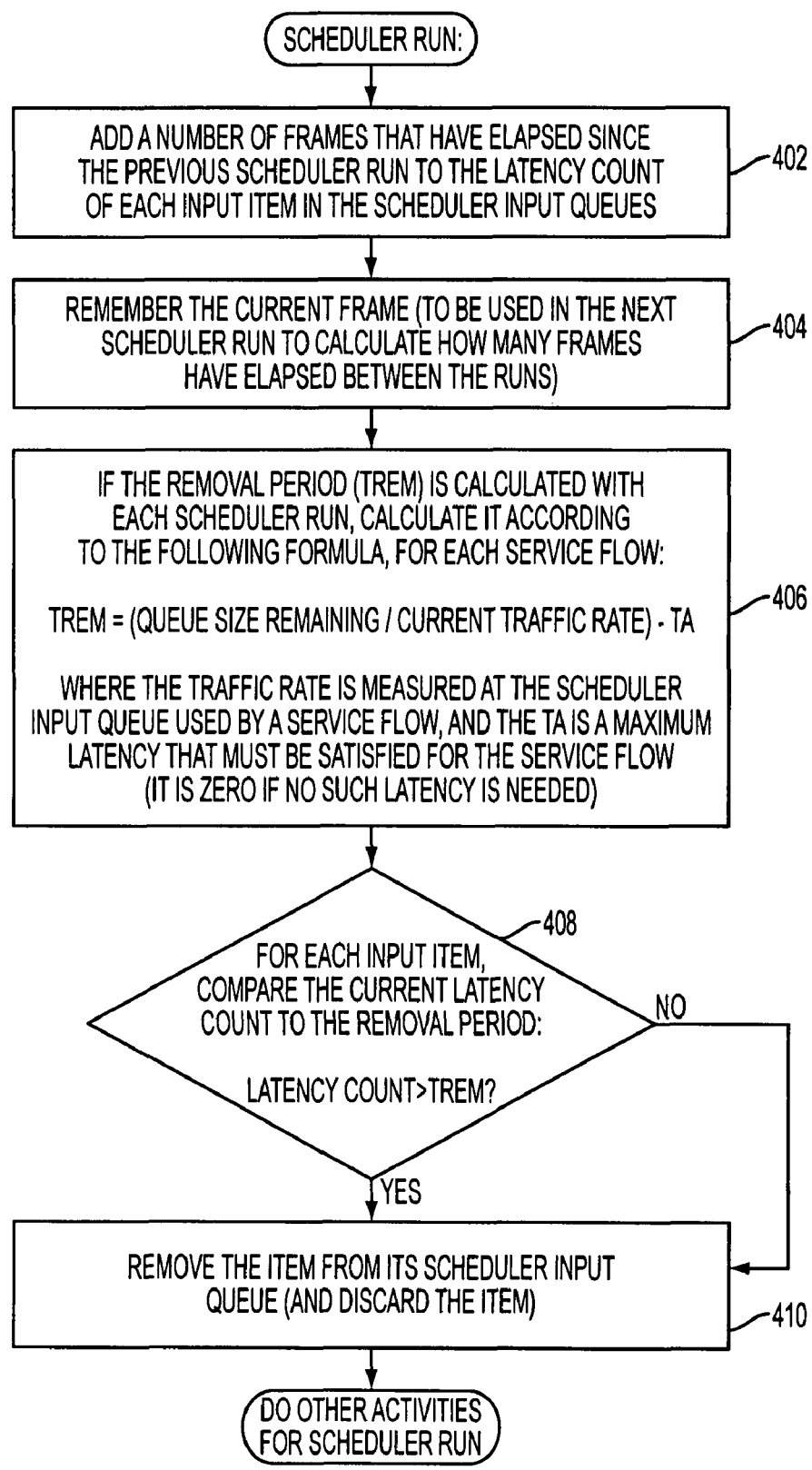
FIG. 4 is a flow chart illustrating a procedure of removing items from a scheduler input queue at a scheduler run according to an embodiment of the present invention.

FIG. 4 is a flow chart illustrating a procedure of updating the latency count of each input item of being in an input queue of the scheduler, optionally updating the removal periods, comparing the latency count to the removal period, and removing items from a scheduler queue. All these activities are done at the beginning of each run of the scheduler. Referring now to FIG. 4, in operation 402, the latency count of an input item is updated by adding the number of frames that have elapsed since the previous scheduler run. This information may be obtained by having all transmitted frames numbered in the MAC layer, and by remembering the current frame at each scheduler run, as shown in operation 404, then comparing it to the current frame number at the next scheduler run, in operation 402.

From operation 404, the process moves to operation 406, where the removal periods are recalculated for the used service flows. This operation is optional; it may be set to be executed during system planning and configuration. The formula for the removal period Trem is as described above in formula (1), with an adjustment for the initial value of the latency count, Ta, which may be an allowed latency for the service flow (this value may be zero if there no timing requirement on the service flow).

From operation 406, the process moves to operation 408, where the current latency count is compared to the removal period Trem and, if the comparison indicates that the current latency count exceeds the removal period Trem, the item is removed from the queue, in operation 410.

FIG. 4 represents only an exemplary process, and embodiments of the present invention are not limited to a process including all of the operations shown in FIG. 4. Instead, some of the operations may be eliminated or rearranged without departing from the spirit of the present invention.

Figure 5:
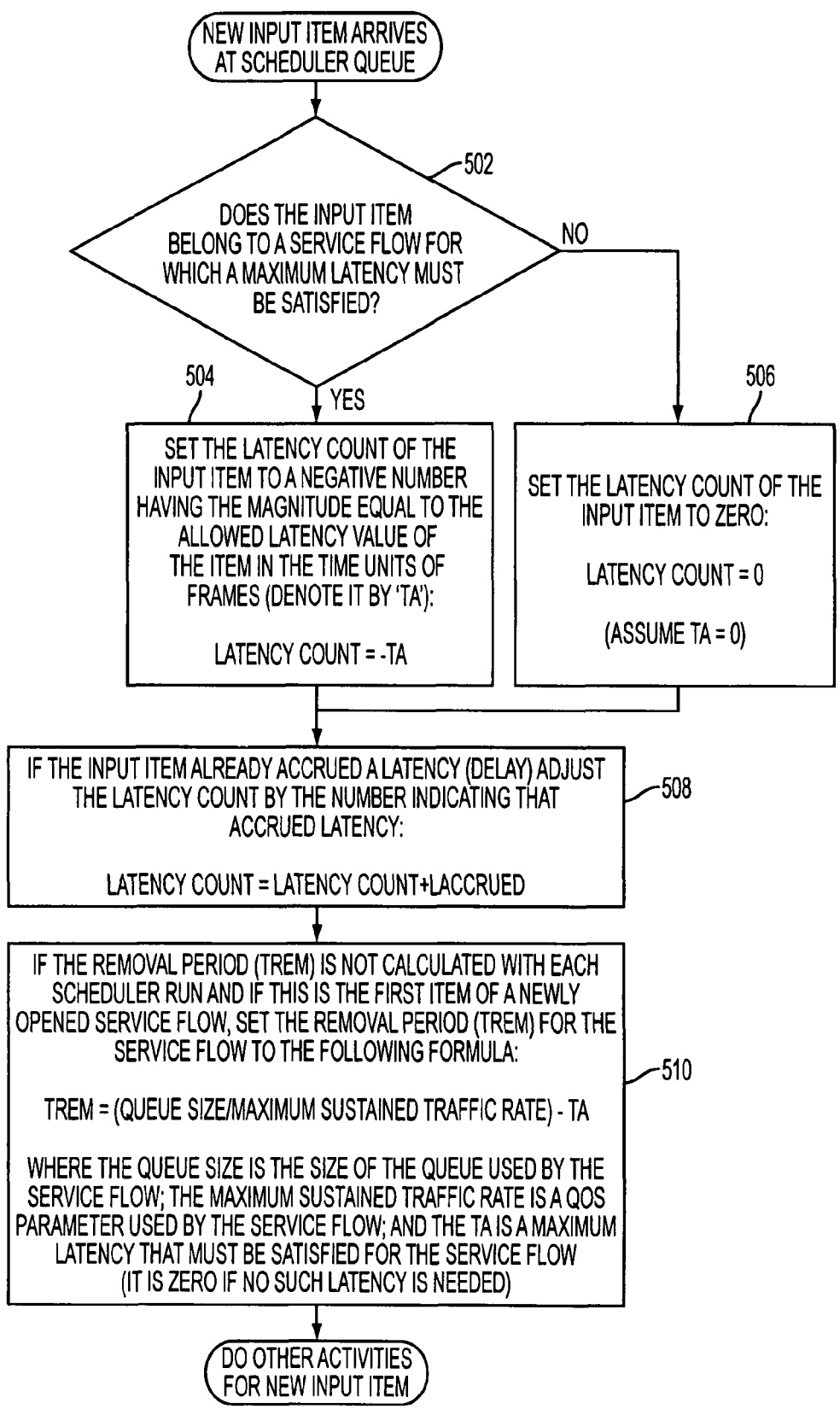
FIG. 5 is a flow chart illustrating a procedure for setting a latency count of an item entering a queue according to an embodiment of the present invention.

FIG. 5 is a flow chart illustrating a procedure for setting a latency count of an item entering a queue. Referring now to FIG. 5, in operation 502, there is check if the service flow to which the new input item belongs must satisfy a maximum latency parameter (which may come directly from a QoS latency parameter or it may be calculated, like from the jitter). If the check is positive, in operation 504, the latency count of the item entering the queue is set to a negative number having a magnitude equal to an allowed latency value. If the check is negative, in operation 506, the latency count of the item entering the queue is set to zero.

From operation 504 or 506, the process moves to operation 508, where the latency count of the item is adjusted by adding a positive number, Taccrued, equal to the already accrued latency of the input item.

From operation 508, the process moves to operation 510, where the removal period is determined for the service flow of the input item (to be applicable to all the input items of this service flow). This operation is necessary only on the first item of a newly opened service flow. This operation is optional here, since the removal periods may be recalculated dynamically on each scheduler run; it may be set to be executed during system planning and configuration. The formula for the removal period Trem is as described above in formula (1), with an adjustment for the initial value of the latency count, Ta, which may be an allowed latency for the service flow (this value may be zero if there no timing requirement on the service flow).

FIG. 5 represents only an exemplary process, and embodiments of the present invention are not limited to a process including all of the operations shown in FIG. 5. Instead, some of the operations may be eliminated or rearranged without departing from the spirit of the present invention.

Embodiments of the present invention are applicable to stations operating under the IEEE 802.16 standard, which includes its extensions and amendments. However, embodiments of the present invention are not limited to this standard. Rather, stations operating under other standards, or no standards at all, could be practiced without departing from the spirit of the present invention. Moreover, the IEEE 802.16 standard is incorporated herein by reference in its entirety.

Although a few preferred embodiments of the present invention have been shown and described, it would be appreciated by those skilled in the art that changes may be made in these embodiments without departing from the principles and spirit of the invention, the scope of which is defined in the claims and their equivalents,

What is claimed is:

1. A scheduler of a station in a wireless network, the scheduler having a queue of items and a removal period, each of the items having a latency count that is updated on each run of the scheduler, an item being removed from the queue when a current latency count associated with the item exceeds the removal period,
wherein the latency count is a count of frames, and
wherein the removal period is equal to a ratio of a remaining length of the queue and a current traffic rate, or the removal period is equal to a ratio of a remaining length of the queue and a maximum sustained traffic rate.

2. The scheduler according to claim 1, wherein a latency count of an item entering the queue is set to a negative number having a magnitude equal to an allowed latency value of the item.

3. The scheduler according to claim 1, wherein a latency count of an item entering the queue is calculated from a quality of service latency parameter or a jitter parameter.

4. The scheduler according to claim 1, wherein a latency count of an item entering the queue is set to zero.

5. The scheduler according to claim 1, wherein the latency count of the item is updated at the beginning of a run of the scheduler by adding a number of frames that have elapsed since a previous run of the scheduler to the latency count.

6. A method of removing items from a scheduler queue on a scheduler, comprising:
assigning a latency count to an item equal to a negative number having a magnitude equal to an allowed latency value of the item;
adding a number of frames that have elapsed since a previous scheduler run of the scheduler to the latency count at each scheduler run to obtain a current latency count;
comparing the current latency count to a removal period;
removing the item when the comparison indicates that the current latency count exceeds the removal period before the item has been output from the queue, and
setting the removal period equal to a ratio of a remaining length of the queue and a current traffic rate, or setting the removal period equal to a ratio of a remaining length of the queue and a maximum sustained traffic rate.

7. The method of removing items from a scheduler queue according to claim 6, in which the latency count is calculated from a quality of service latency parameter or a jitter parameter.

8. The method of removing items from a scheduler queue according to claim 6, further comprising setting a latency count of an item entering the queue to a negative number having a magnitude equal to an allowed latency value of the item.

9. The method of removing items from a scheduler queue according to claim 6, further comprising calculating a latency count of an item entering the queue from a quality of service latency parameter or a jitter parameter.

10. The method of removing items from a scheduler queue according to claim 6, further comprising setting a latency count of an item entering the queue to zero.

11. The method of removing items from a scheduler queue according to claim 6, further comprising updating the latency count of the item at the beginning of a run of the scheduler by adding a number of frames that have elapsed since the previous run of the scheduler to the latency count.

12. A system of removing items from a scheduler queue, comprising:
means for assigning a latency count to a negative number having a magnitude equal to an allowed latency value of the item;
means for adding a number of frames that have elapsed since a previous scheduler run to the latency count at each scheduler run to obtain a current latency count;
means for comparing the current latency count to a removal period;
means for removing the item when the comparison indicates that the current latency count exceeds the removal period as before the item has been output from the queue; and
means for setting the removal period equal to a ratio of a remaining length of the queue and a current traffic rate, or means for setting the removal period equal to a ratio of a remaining length of the queue and a maximum sustained traffic rate.

13. A scheduling system for a station, the system comprising:
a scheduler processing a plurality of items of user data and management messages in one or more input queues, each of the items having a latency count;
the input queues having a predetermined size and a calculated or predetermined rate at which items arrive at the queues;
wherein the latency count is incremented on each run of the scheduler by a number of frames that have passed the scheduler since the item was put in the input queue;
wherein an item is removed from the input queue when the latency count exceeds a ratio of the predetermined size and the predetermined rate,
wherein the predetermined size is equal to a remaining length of the queue, and
wherein the predetermined rate is equal to a current traffic rate or a maximum sustained traffic rate.

* * * * *